April 29, 1924. Re. 15,824

S. H. CALKINS

PATTERN AND GUIDE STRIP

Original Filed Nov. 15, 1919

INVENTOR
SEWARD H. CALKINS
BY Robert M. Hander
ATTORNEY

Reissued Apr. 29, 1924.

Re. 15,824

UNITED STATES PATENT OFFICE.

SEWARD HOMER CALKINS, OF LONG ISLAND CITY, NEW YORK, ASSIGNOR TO TRAITEL MARBLE CO., OF LONG ISLAND CITY, NEW YORK, A CORPORATION OF NEW YORK.

PATTERN AND GUIDE STRIP.

Original No. 1,371,857, dated March 15, 1921, Serial No. 338,353, filed November 15, 1919. Application for reissue filed February 14, 1924. Serial No. 692,918.

*To all whom it may concern:*

Be it known that I, SEWARD HOMER CALKINS, a citizen of the United States, and a resident of the city of New York, Long Island City, borough of Queens, in the county of Queens and State of New York, have invented a new and useful Pattern and Guide Strip, of which the following is a full, clear, and exact description.

This invention relates to pattern and guide strips for plastic work, and has for an object to provide an improved device which will permit the ready depositing and finishing of wall or floor coatings of a number of different colors without the various colors commingling.

Another object of the invention is to provide a strip which acts as means for guiding the plastic material when being placed in position and also as a leveling and height controlling means.

A still further object in view is to provide a strip which will act as a guide and pattern for plastic floors, walls, and the like, which will in addition provide for the expansion of material and which need not be removed after the work has been completed, so that the same or different colors may be readily used and treated in the proper manner for producing the best results.

Figure 1:
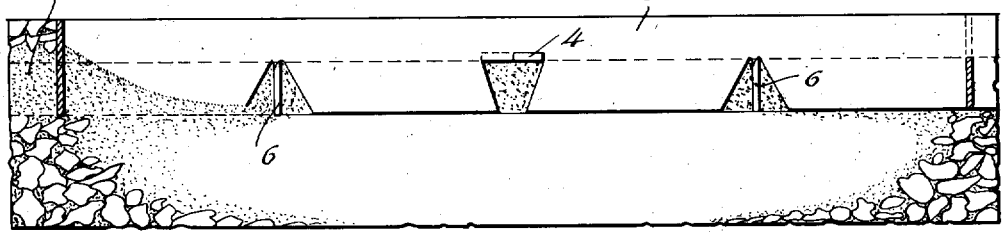
Figure 1 is a longitudinal vertical section through part of a floor showing a pattern and guide strip embodying the invention.

In laying concrete floors, walls, or ceilings, the material must be properly mixed and placed in position and then allowed to season or harden before it is used. Where a mosaic is to be provided, for instance what is known as a "terrazzo mosaic" the concrete is mixed with coloring matter if desired and also with marble or other material, and is pressed by any suitable means, as for instance a roller until the texture is comparatively close. After this has been done the prepared floor is allowed to season or harden to a certain extent, which requires several days. After it has been properly seasoned or hardened by the action of the air, the top surface is ground, either manually or by a grinding machine to produce a smooth even finish. If the grinding action takes place before the floor has properly set the floor will be so soft as to cause an undesirable grinding away and a less desirable finish. If the floor is allowed to set too long and becomes too hard the grinding is more difficult and the finish or polish is not so satisfactory. For this reason workmen are careful to grind the floor at the proper time.

Referring to the accompanying drawings by numerals, 1 indicates a foundation of any kind on which a lower bed 2 is placed, said lower bed being cement, sand, and if desired gravel, mixed to provide a comparatively compact bed. This lower bed is then levelled off by any suitable means. While this bed is still green, or soft, a strip 3 is placed in position thereon and forced downwardly until the wings 4 engage the upper surface of the lower bed 2. By means of the wings 4 the strips are held in such a position that the upper edge of the strip 3 will be at a certain height from the upper surface of the lower bed 2. Preferably the lower bed 2 is made of the proper thickness to allow the edge of strip 3 to rest on the foundation 1, though this is not essential. The arrangement of the parts as just described permits the strip 3 to act as a height guide when placing the upper bed or finishing layer 5 in place.

In forming the strip 3, the wings 4 are pressed out from the lower half of the strip along a predetermined longitudinal line, preferably the central longitudinal line, to and including portions of the lower edge of the strip.

Preferably also, the wings 4 are pressed out from the body of the strip on vertically inclined lines converging toward the lower edge of the strip as shown in Fig. 1. By means of such construction, the opening formed by pressing out said wings has vertically inclined margins, and when the strip is placed in the under bed while the bed is in a semi-plastic condition, the material forming the bed is pressed into said opening and forms, with the bed, a keystone shaped interlocking connection between the under bed and strip, that securely holds the strip against vertical displacement.

Figure 2:
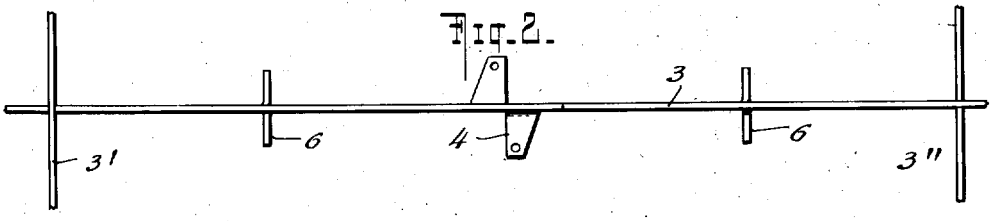
Fig. 2 is a top plan view of the guide strip shown in Fig. 1.

While not essential in all cases, it is desirable to slit the portion pressed out from the lower half of the strip so as to form double wings arranged in juxtaposition on opposite sides of the strip, as shown in Fig. 2. By such means, the stresses imposed upon the strip by the upper bed or finishing coating are evenly distributed, and contribute materially toward holding the strip in fixed position, and toward maintaining an even expansion of the upper bed along the line of the strip, and prevent irregular cracking of said bed or surface.

In addition to the wings 4, anchoring and levelling members 6 may, if desired, be pressed out from the lower half of the strip, and twisted so as to place the faces thereof at an angle to the sides of the strip, as shown.

After the strip has been placed in position and the lower bed 2 is allowed to harden, member 6 will also act as a firm anchor for holding the strip against displacement.

The strips 3 are notched at intervals, according to the design desired and transverse strips 3′ and 3″ are similarly notched and are interlocked with strip 3 as shown in Fig. 2. The strips 3 may be of any length and have any desired number of wings 4 and anchoring members 6, so that it will remain in proper position regardless of its length or the way in which it is bent or formed.

Figure 4:
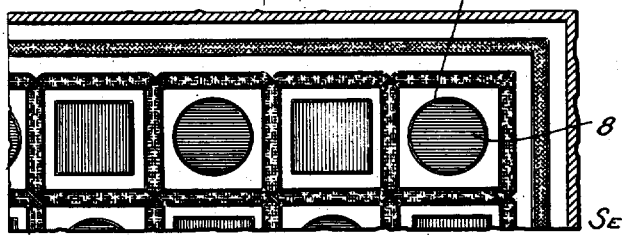
Fig. 4 is a fragmentary top plan view of a finished piece of floor construction with a pattern and guide strip embodying the invention.

In Fig. 4 a finished floor is shown having a ring 7 made from a strip 3, in which a quantity of a certain colored material 8 is deposited, the material exteriorly of the ring being of a different color. The flooring shown in Fig. 4 is arranged with a number of different patterns producing a general effect desired. Other forms could be provided without departing from the spirit of the invention. When forming the floor shown in Fig. 4 or forming any other floor, wall, or ceiling, strips 3 are properly shaped and placed in position as shown in Fig. 1 and described in connection with said figure. The various colored plastic materials are then supplied to the various places desired, said depositing of the various materials being done at one time so that the aging will be even throughout. After the material has been properly aged a grinding machine is passed over the floor and the floor ground to the desired extent.

Figure 3:
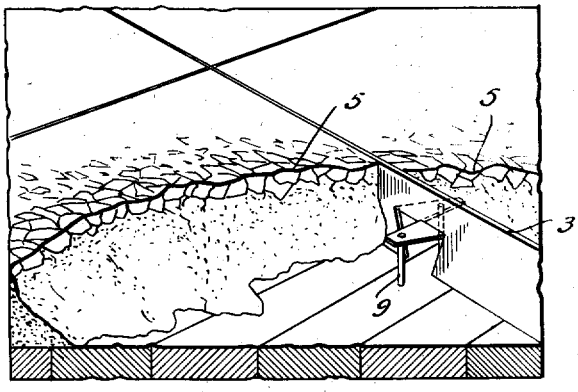
Fig. 3 is a fragmentary perspective view showing an embodiment of the invention applied to a wood floor.
Figure 6:
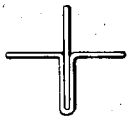
Fig. 6 is an end view of a slightly modified form of guide strip.
Figure 7:
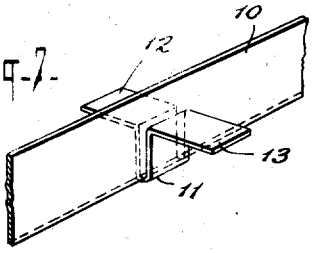
Fig. 7 is a perspective view of a part of a guide strip of the kind shown in Fig. 6.

The strips 3 are preferably brass, though other material could be used, brass being desirable because it will grind away easily along with the upper surface of the cement or other material used in the body of the floor. Ordinarily the strips are arranged as shown in Fig. 1, and if it is desired to place a mosaic on a wood floor the strips may be held against said floor by nails 9, (Fig. 3), said nails passing through suitable apertures in the wings 4.

Figure 5:
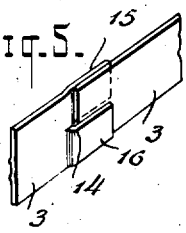
Fig. 5 is a detail fragmentary perspective view showing two guide strips connected together end to end.

In some circumstances it might be desirable to provide a strip 10 similar to strip 3, except that it is solid throughout. In order to properly anchor this strip in place and also to properly support the same on the lower bed 2 a clip 11 is provided having a U-shaped section into which the strip 10 fits, said U-shaped section merging into side wings 12 and 13. If desired the clip 11 could be soldered, riveted, or otherwise secured to strip 10, though ordinarily this is not necessary. Where two strips 3, or two strips 10 are to be arranged in tandem an overlapping joint is provided as shown in Fig. 5. This structure is provided by merely slitting one of the strips 3 at 14 and bending the sections 15 and 16 to one side so that the end of the next adjacent strip 3 may be slid therein.

From the foregoing description, considered in connection with the accompanying drawings, the construction, manner of use, and the several advantages of the present invention will be clearly and fully understood.

All concrete floors, walls, and ceilings are subjected to the strains and stresses caused by the settling, shrinking and general distortion of their supporting structure, resulting at times, in cracks forming in the floors, walls and ceilings. At first dividing strips were placed in the material forming the floors, for the purpose of dividing the flooring into sections so that if cracks appeared in the flooring, the section containing the cracks might be cut out and relaid without disturbing the adjacent sections. Incidentally such an arrangement provided means for filling the respective sections with material of different coloring.

But a dividing strip in and of itself does not control the course taken by a crack or cleavage. On the contrary, the dividing strip is subjected to the same forces that produce the cracks, and becomes loosened from its setting in the cement compound, and in some cases its upper edge becomes exposed above the surface of the flooring, making an unsightly and otherwise objectionable surface.

In order to control, or aid in controlling the course of a crack forming in the underbed, the strip must be enabled to maintain a fixed position against stresses tending to raise the strip vertically and that is accomplished in the present invention by means of the anchoring wings 4, and members 6. These members by being pressed out from the lower half of the strip through the lower edge thereof, enable the material forming the floor to be pressed into the openings formed by pressing out such portions, which material forms a component part of the underbed 2, and together with the offset wings 4, hold the strip against vertical displacement. When so held the strip forms a path of least resistance in the flooring, and absorbs the crack along the line of the strip where it becomes practically unnoticeable.

In addition to taking care of cracks forming in the flooring due to distortion of the floor supporting members, the device of this invention enables the flooring to be laid in a facile, economical and practical manner with a minimum amount of effort and in the shortest time possible, and in a manner that insures uniformity of setting or hardening of the material, thereby preventing any cracks forming in the flooring due to expansion or contraction of the flooring itself.

What I claim is:

1. A pattern and guide strip of the character described, comprising a substantially flat thin flexible strip of metal extending vertically in cross section, and having a width adapting the strip to serve as a height-guide in placing a desired thickness of plastic material on a wall or flooring, and having an uninterrupted straight upper edge defining the upper level of said plastic material, and a plurality of wings pressed out of said strip from substantially the central longitudinal line, to and including portions of the lower edge thereof, and extending outwardly from opposite sides of said strip, with the faces of said wings substantially parallel with the upper edge of the strip, said wings defining the depth of the finishing coat of said material relative to the upper surface thereof, 2. A pattern and guide strip of the character described, comprising a substantially flat thin flexible strip of metal extending vertically in cross section, and having a width adapting the strip to serve as a height-guide in placing a desired thickness of plastic material on a wall or flooring, and having an uninterrupted straight upper edge defining the upper level of said plastic material, and a plurality of wings pressed out of said strip along vertically inclined lines converging toward the lower edge of said strip from substantially the central longitudinal line thereof to and including the lower edge of said strip, with the faces of said wings substantially parallel with the upper edge of the strip, said wings defining the depth of the finishing coat of said material relative to the upper surface thereof, said vertically inclined lines of said strip and said wings defining openings in said strip whereby a keystone shaped interlocking connection is formed between said plastic material and strip that securely holds the strip in place against vertical displacement.

3. A pattern and guide strip of the character described, comprising a substantially flat thin flexible strip of metal extending vertically in cross section, and having a width adapting the strip to serve as a height-guide in placing a desired thickness of plastic material on a wall or flooring, and having an uninterrupted straight upper edge defining the upper level of said plastic material, and a plurality of pairs of wings, the respective members of each pair being arranged in juxtaposition on opposite sides of said strip and extending outwardly therefrom on substantially the central longitudinal line of said strip, with the faces of said wings substantially parallel with the upper edge of said strip, said wings defining the depth of the finishing coat of said material relative to the upper surface thereof.

4. A pattern and guide strip of the character described, comprising a substantially flat thin flexible strip of metal extending vertically in cross section, and having a width adapting the strip to serve as a height-guide in placing a desired thickness of plastic material on a wall or flooring, and having an uninterrupted straight upper edge and a plurality of pairs of wings pressed out of said strip from substantially the central longitudinal line, to and including portions of the lower edge thereof, the respective members of each pair extending outward from opposite sides of said strip with their faces substantially parallel with the upper edge of said strip, said wings defining the depth of the finishing coat of said material relative to the upper surface thereof.

5. A pattern and guide strip of the character described comprising a substantially flat thin flexible strip of metal extending vertically in cross section, and having a width adapting the strip to serve as a height-guide in placing a desired thickness of plastic material on a wall or flooring, and having an uninterrupted straight upper edge and a plurality of supporting and anchoring members pressed out from the lower half of said strip on vertically inclined lines diverging from the central longitudinal line of said strip to the lower edge thereof, with the faces of said members arranged in a vertical plane at an angle to the sides of said strip, the inclined edges of said wings being adapted to have a locking engagement with said plastic material, and hold the strip against vertical displacement.

6. A pattern and guide strip of the character described, comprising a plurality of sections, each having an uninterrupted straight upper edge and an end slitted longitudinally of said section, and having a forked engagement with the correspondingly slitted end of an adjacent section.

SEWARD HOMER CALKINS.